(12) United States Patent
Wobben

(10) Patent No.: US 7,042,176 B2
(45) Date of Patent: May 9, 2006

(54) VEHICLE

(76) Inventor: Aloys Wobben, Argestrasse 19, Aurich (DE) 26607

( * ) Notice: Subject to any disclaimer, the term of this patent is extended or adjusted under 35 U.S.C. 154(b) by 0 days.

(21) Appl. No.: 10/502,492

(22) PCT Filed: Jan. 23, 2003

(86) PCT No.: PCT/EP03/00638

§ 371 (c)(1),
(2), (4) Date: Feb. 15, 2005

(87) PCT Pub. No.: WO03/062018

PCT Pub. Date: Jul. 31, 2003

(65) Prior Publication Data

US 2005/0127855 A1 Jun. 16, 2005

(30) Foreign Application Priority Data

Jan. 24, 2002 (DE) .............................. 102 02 828

(51) Int. Cl.
*H02P 1/00* (2006.01)
(52) U.S. Cl. ................. 318/139; 388/800; 388/825
(58) Field of Classification Search ............... 318/139; 361/86, 82, 92; 320/13, 40; 307/10.7; 388/800, 388/825
See application file for complete search history.

(56) References Cited

U.S. PATENT DOCUMENTS

| 6,463,545 | B1 * | 10/2002 | Fisher et al. ............... 713/340 |
| 6,646,845 | B1 * | 11/2003 | Turner et al. ................ 361/86 |
| 2003/0197485 | A1 * | 10/2003 | Miller et al. ............... 320/112 |

FOREIGN PATENT DOCUMENTS

| DE | 43 37 978 A1 | 6/1994 |
| DE | 692 20 228 T2 | 9/1997 |
| DE | 197 22 644 C1 | 9/1998 |

OTHER PUBLICATIONS

Bojrup, M., et al., "A Dual Purpose Battery Charger for Electric Vehicles," in *Proceedings of the 29th Annual IEEE Power Electronics Specialists Conference*, Fukuoka, May 18-21, 1998, pp. 565-570.

Takano, A., "Development of Quick Charging Station for Electric Vehicle," in *Proceedings of the International Electric Vehicle Symposium*, Anaheim, Dec. 5-7, 1994, pp. 709-718.

* cited by examiner

*Primary Examiner*—Karen Masih
(74) *Attorney, Agent, or Firm*—Seed IP Law Group PLLC

(57) ABSTRACT

The present invention concerns a motor vehicle comprising at least one electric motor, an energy storage device for providing drive energy for the electric motor, a plug connector connected to the energy storage device for connection to a current source and a control means for controlling the flow of current from the current source to the energy storage device. Therefore the object of the invention is to provide a motor vehicle which can contribute to moderating the loading at consumption peaks in the network. A motor vehicle comprising at least one electric motor, an energy storage device for providing drive energy for the electric motor, a plug connector connected to the energy storage device for connection to a current source and a control means for controlling the flow of current from the current source to the energy storage device, characterized in that the control means permits a flow of current from the energy storage device to the current source (network).

15 Claims, 3 Drawing Sheets

VEHICLE

BACKGROUND OF THE INVENTION

1. Field of the Invention

The present invention at least one electric motor, an energy storage device for providing drive energy for the electric motor, a plug connector connected to the energy storage device for connection to a current source and more particularly, a control means for controlling the flow of current from the current source to the energy storage device and out of the energy storage device.

2. Description of the Related Art

Vehicles with an electric motor have been known for some time and are eminently suitable for journeys over short and medium distances. In order to make such a vehicle usable the available energy storage device has to be charged up. When the vehicle has covered a certain distance the energy storage device has to be charged up again. In that case, a careful driver will re-charge the energy storage device after each journey in order to always have at his disposal the greatest possible range.

As journeys with these vehicles—like also with all other vehicles—cannot always be exactly planned in advance, it can happen with such a procedure that the energy storage device of the vehicle is to be charged up precisely when the cost of the energy is at its highest, and when in addition the electrical supply network (the network) is most heavily loaded, for example during what is referred to as a midday peak.

That is disadvantageous for multiple reasons, including the high price of buying the energy and the additional loading on the electrical supply network, which in any case is already highly loaded.

BRIEF SUMMARY OF THE INVENTION

The present invention is directed toward vehicles with at least one electric motor. In particular, embodiments of the present invention allow the user of the vehicle to economically benefit by synchronizing the charging of the energy storage device to low electrical consumption periods during a conventional day, and getting reimbursed at a higher rate by supplying energy back to the network during high electrical consumption periods during a conventional day. Embodiments of the present invention further provide a motor vehicle that can contribute to moderating the loading during high electrical consumption peaks in the network. Additionally, the instant invention provides means to prevent the overcharging of the energy storage device.

The objects of the present invention are attained by a motor vehicle of the kind set forth in the opening part of this specification, in that the control means permits a flow of current from the energy storage device to the current source. In that way a flow of current can take place from the energy storage device of the motor vehicle back into the network and can thus contribute to covering the high electrical consumption peak demand.

In a preferred embodiment of the present invention the flow of current from the energy storage device to the current source, for example into the current network, is controlled in such a way that a predeterminable residual amount of electrical energy is retained in the energy storage device, by the control means interrupting the flow of current to the network when said predetermined residual charge amount is reached. For that purpose, there is provided a device for detecting the amount of charge in the energy storage device.

In a preferred embodiment of the present invention the control means communicates with the network through a communication device so that the draw of energy can be controlled in the optimum fashion from the network, depending on the location of the motor vehicle and the available amount of charge.

In a preferred embodiment of the present invention, the control means is designed in such a way that it includes a clock or is connected to a clock. In that way the control means can operate in such a fashion that charging and discharging operations take place in predeterminable periods of time. It is possible in that way to preferably charge up the energy storage device at night when on the one hand the loading on the supply network is low and on the other hand the costs of charging it up are low, while discharging preferably takes place at times when relieving the load on the supply network makes sense and the costs of the energy are higher than the costs during the charging procedure. In that way it is also possible to achieve an economic advantage, from the point of view of the operator of the vehicle, in addition to relieving the load on the supply network.

DETAILED DESCRIPTION OF THE INVENTION

Figure 1:
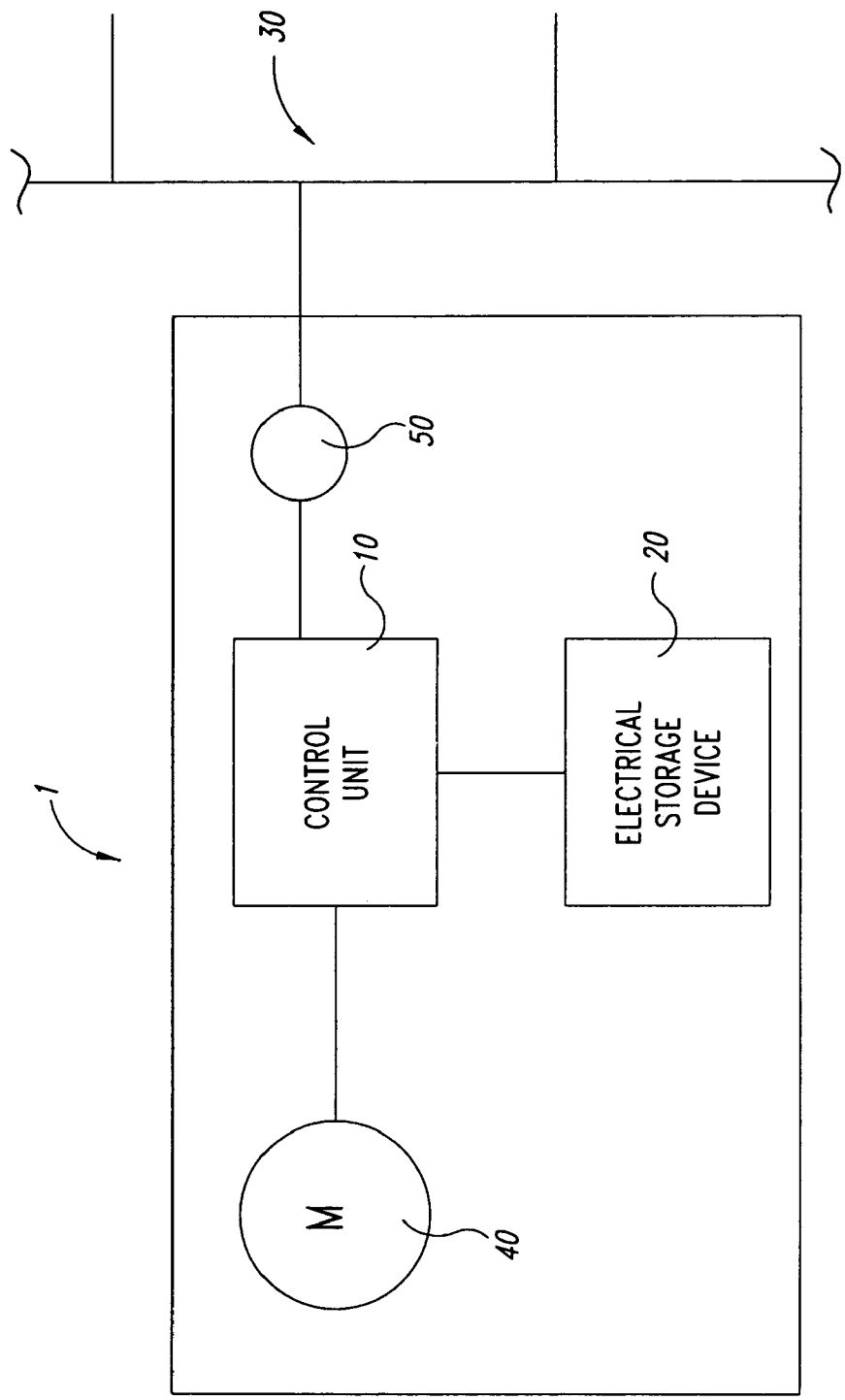
FIG. 1 is a simplified block circuit diagram depicting an arrangement of a control means, an energy storage device, a drive motor, and a releasable connector, connected to a current source, according to one embodiment of the present invention.

FIG. 1 shows a simplified block circuit diagram of the arrangement of components according to the present invention. A frame 1 includes those components that are associated with the motor vehicle. Accordingly, the motor vehicle includes a control means 10. The control means 10 is connected to an energy storage device 20, a drive motor 40 and a releasable connector 50 which for example may be in the form of a plug connector. There is also a connection between the connector 50 and a current source 30, which in one embodiment of the instant invention as indicated in FIG. 1, may be in the form of an electrical current supply network.

In order to provide sufficient energy for operation of the motor vehicle 1, the control means 10 monitors the charge condition of the energy storage device which can be for example a battery, a capacitor storage device, or the like. When the control means 10 recognizes that charging of the energy storage device 20 is required, the control means 10 allows a flow of current from the network 30 to the energy storage device 20 by way of the connector 50 and the energy storage device is charged up. It will be appreciated that, in that case, the control means 10 can also take account of the corresponding charging characteristics of the energy storage device so that overcharging of the energy storage device may be reliably prevented.

The control means can also permit charging in a predeterminable first period of time. That makes it possible for the energy storage device 20 to be preferably charged up at night when on the one hand the price of the electric current is low and thus the costs involved in charging the energy storage device also remains comparatively low while on the other hand the loading on the supply network 30 is not very high. In addition the control means can be so designed that it permits a flow of current from the energy storage device 20 by way of the plug connector 50 into the network 30.

In that respect the amount of charge which can be delivered can be limited by a predeterminable residual amount of charge at the energy storage device 20.

For example, after a journey to the place of work, with the energy storage device 20 fully charged, the energy which is still present in the energy storage device can be fed into the network 30 again if the demand is particularly high, for example for the midday peak. However, the control means interrupts the flow of current from the energy storage device 20 into the network 30 when a predeterminable residual amount of charge in the energy storage device 20 is reached, so that at any event an adequate amount of energy in the energy storage device for the return journey in the evening is guaranteed.

It will be appreciated that the current which is fed into the network at the high electrical consumption peak time is to be suitably reimbursed so that in addition to the aspect of relieving the load on the network, there is also an economic advantage to be achieved for the user of the vehicle.

In accordance with one embodiment of the present invention a vehicle with an electrical energy storage device may also be used as an energy source for a power supply network from which the vehicle possibly draws its energy.

As is known the power demand during the day is markedly higher than the power demand at night. Thus for example the power demand in a public power supply network rises from a low point at between 1 A.M. and 4 A.M., the middle of the night towards a morning peak then reaches its highest level (midday peak) around midday and then decreases in the evening again until it reaches its low level in the middle of the night. Since the energy demand at night is markedly lower than the usual available energy supply, energy consumed at nighttime is markedly lower in price than the price for daytime power.

An electrical power supply network then has to be designed in such a way that it has to cover without any problem not only the demand at night, but also the demand at the highest daytime peaks. In regard to the electrical supply utilities, that means that a large number of electrical energy generators must be provided, which reliably guarantee that such a demand is met, even at very high midday peaks (on a cold winter's day).

Now, at this point, the present invention proposes that an electric vehicle which usually draws its electrical energy from an electrical supply network and which therefore also has suitable connections with a connection to an electrical power supply network, if necessary, at a given moment in time, can also feed energy that is not required, into the supply network.

For example, in one embodiment of the instant invention, if the vehicles have to be used by the population working on weekdays, only in the periods between 7 A.M. and 8.30 A.M. and about 4.30 P.M. and 6.30 P.M., such a motor vehicle is in a parking place, without being used, for most of the day. Prior related art has provided for means to charge the energy storage device of an electric vehicle, however, it has failed to recognize or provide means for other advantageous uses of that stored energy when the vehicle is parked. In one embodiment of the instant invention, after the motor vehicle has reached the place of work, it may be connected to an electrical power supply network in order to provide energy back to the network as required, for the peak electrical power consumption times.

If in that case the motor vehicle has at least one energy storage device such as batteries which efficiently discharge or charge up, it is therefore possible, with a number such as 500–1000 units of such vehicles, to provide a very high level of feed-in power for the network.

One particular advantage for the electrical power supply utility is that it can have recourse to an electrical energy storage device, which it has not paid for itself and for the maintenance of which it also does not have to bear responsibility. In accordance with yet another of several objects of the instant invention, from the point of view of the user of the vehicle, the advantage of the invention is that, for example at the midday time when therefore he does not in any case require his motor vehicle because he is at his place of work, he virtually rents the energy storage device, which is still well filled, of his vehicle, to the electrical power supply utility, and can sell the energy contained therein. The consumer can therefore feed the electrical energy from his vehicle into the power supply network at midday and will receive a comparatively higher price, while at night he has to arrange for charging up his vehicle at a lower price (night-time current).

Alternatively, the power output by the energy storage device 20 can be fed into the consumer's own home or workplace to reduce or eliminate the amount of power the consumer draws from the power network during periods when the price of electrical power is higher than the price when the energy storage device 20 was charged with power.

It will be appreciated that, in accordance with the present invention, it is also provided that the electrical energy storage device of the vehicle does not fall below a given minimum level and, if necessary, the energy storage device of the vehicle can also be charged up again after the midday peak, more specifically when the demand, and thus the price, of energy in the network has decreased again in the afternoon.

It can however also be provided that the user individually adjusts his vehicle in such a way that, in the evening, he has sufficient energy to complete his journey home (minimum content of energy with a sufficient level of certainty of arriving home) so that total charging of the energy storage device is only effected again during the following night, with the corresponding night-time current.

In alternate embodiments of the present invention, by means of suitable programming (possibly also by way of remote input (the user employing his cellular phone)), the user of the vehicle can also predetermine the periods or the times only within which discharging of his energy storage device can take place.

The invention may be particularly suitable in conurbations where there are large parking lots and large multi-story car parks. The invention may be quite particularly suitable for use in multi-story car parks at airports, in particular those airports which carry holiday traffic, for at such car parks there are often many thousands of private cars which are completely unused for several days. During that period, a suitable power management system at the corresponding connection of the vehicles, if they are in the form of electric vehicles according to the instant invention, could be made available to the electrical power supply network which discharges the respective energy storage devices of the vehicles at peak times and charges the energy storage devices of the vehicles with electrical energy again at the periods of lower demand.

The invention is described in greater detail hereinafter in accordance to one embodiment as illustrated in the FIG. 1.

Figure 2:
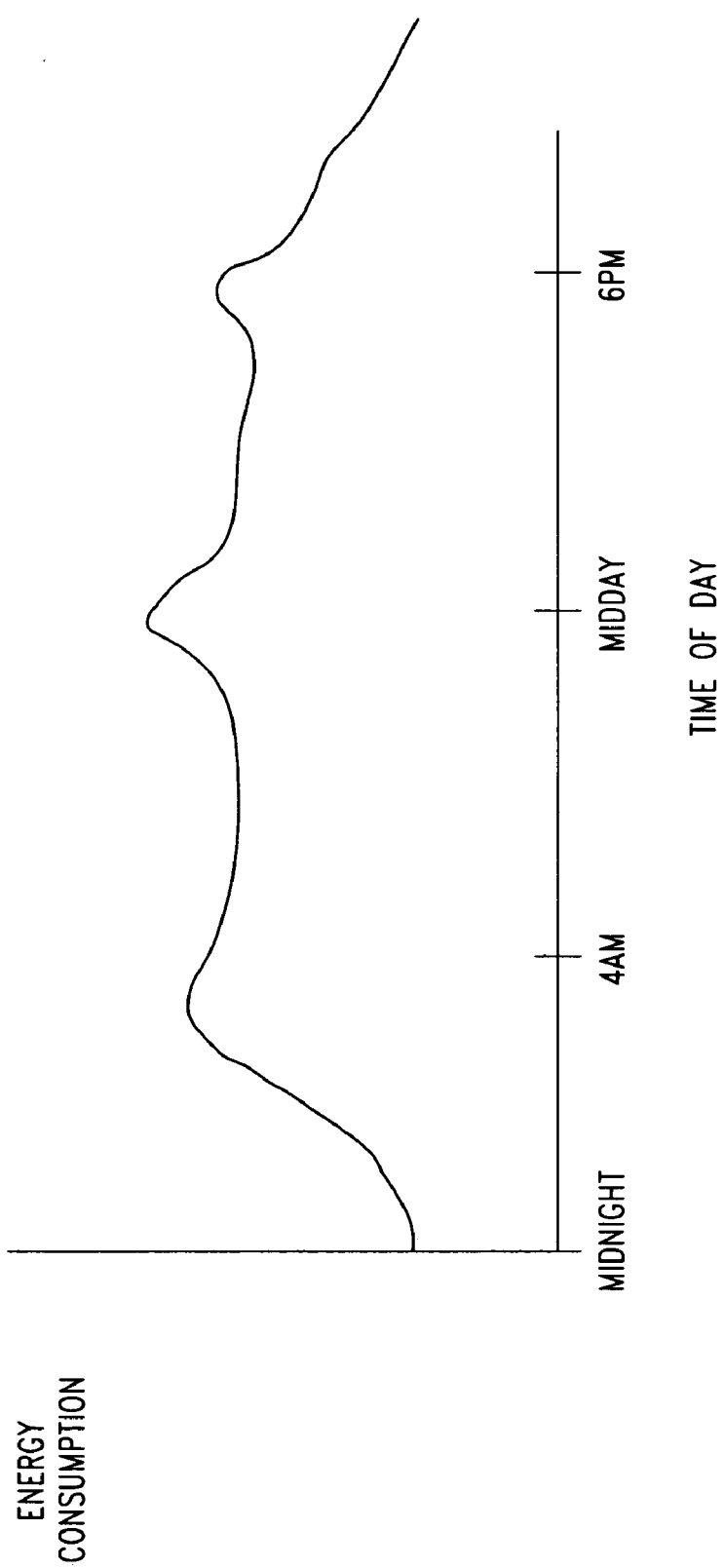
FIG. 2 is a graph representing an example of the power demand on an electrical power supply utility with respect to different times throughout a conventional day.
Figure 3:
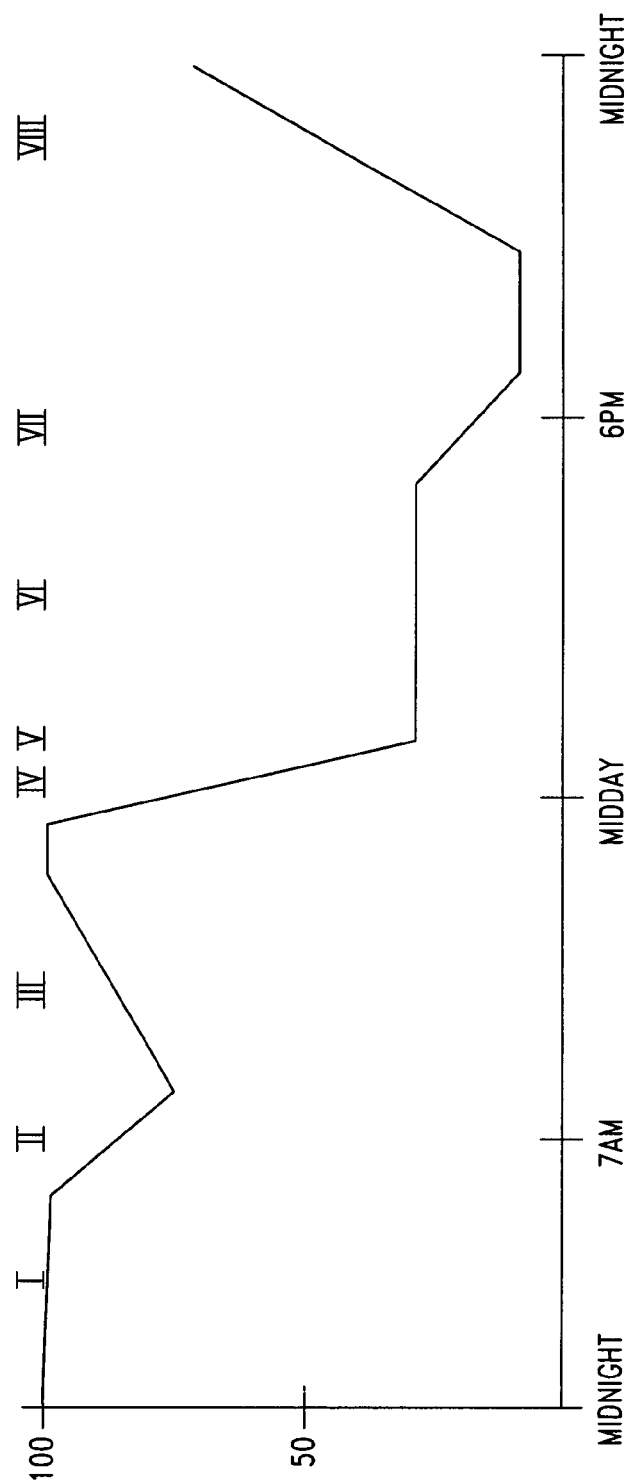
FIG. 3 is a graph portraying a charge condition time-table with the charge condition of a vehicle according to one embodiment of the present invention in relation to the time throughout a conventional day.

Herein FIG. 1—as described—shows an overview of the connection of a vehicle according to one embodiment of the present invention to an electrical power supply network. FIG. 2 shows a conventional day chart of the power demand in the case of an electrical power supply utility. FIG. 3 shows a charge condition time table with the charge condition of a vehicle according to one example of use of the present invention.

The energy storage device 20 of the vehicle 1 is equipped with a suitable electronic control means (power management system) 10 which makes it possible to trigger and control not only electrical charging but also discharging of the energy storage device.

In addition the power management system can also be programmed in such a way that discharging is possible only for a quite specific time which is predetermined by the user. For example, it can be provided that discharging and thus a feed of power into the electrical energy supply network is possible only during the time from 10 A.M. to 3 P.M., otherwise, when the vehicle is connected to the supply network, the energy storage device is being correspondingly charged.

The power management system or control means 10 can also be programmed in such a way that, when discharging is effected in the period from 7 A.M. to 4 P.M., charging does not take place straightaway, but charging occurs only in the night period between 12 midnight and 4 A.M., particularly when appropriate night-time current is to be taken from an electrical supply network.

In addition the power management system or control means 10 of the vehicle can be programmed in such a way that basically a minimum amount of charge remains in the energy storage device, that is to say cannot be fed into the supply network, in order in any case to ensure that the user can properly travel the distance that he wants, in his vehicle, for example the journey home from his place of work.

It will be appreciated that still further programming modes are possible, so that the power management system can also be set by the user himself, in any conceivable manner, according to his respective wishes, while if necessary there is the possibility of a feed into the power supply network.

As can be seen from FIG. 2 the current/energy demand of an electrical supply utility (ESU) is not distributed linearly over the entire day, but rises from a lowest point early in the morning (about 1 am to 3 am), reaches a first morning peak, then later reaches the so-called midday peak, that is to say its highest point, and then decreases irregularly towards the night again. The electrical power supply network which has the responsibility of always making sufficient electrical energy available to the consumers connected to the electrical supply network, even at peak times, has to ensure that appropriate energy is fed into the supply network; that there is always so much energy in readiness at all times, including extraordinary high electrical consumption peak times; and that it provides electrical supply with electrical energy at a constant voltage level and a constant frequency at all times. It is apparent that a large number of control interventions both on the producer side and also in terms of the distribution of electrical energy is already required nowadays for that purpose.

FIG. 3 shows a configuration by way of one of numerous possible examples of the charge condition of the electrical energy storage device of a vehicle according to the instant invention. In the electrical energy storage device which was charged with night-time current during the night, and which therefore exhibits a one hundred percent filling (I), that charge condition falls, in the morning journey (II) to the place of work. When the place of work is reached (III) and the vehicle is connected by way of the electric lines to the electrical supply network, the charge condition is possibly returned to one hundred percent again. At the midday time (IV), when the midday peak occurs (see FIG. 2), a large part of the stored electrical energy in the energy storage device is fed into the connected electrical supply network so that the charge condition correspondingly falls within a very short time to a prescribed minimum (V). That minimum has been set by the user or the vehicle manufacturer (it can also be set in another fashion) and should be sufficient for the vehicle to be able to still make the journey home, without charging it up beforehand.

In the illustrated example however the charge condition can also be increased again in the afternoon (VI) by taking energy from the supply network and during the journey home (VII) the charge condition further falls again. When the electric vehicle is subsequently connected to the electrical power supply network the charge condition can be restored to the prescribed value (100%) again in the evening or at night (VIII).

It should be pointed out once again that the configuration as set forth in FIG. 3 is given purely by way of example. One skilled in the art, however, will understand that the present invention may have alternative charge condition configuration depending on the manner of usage by the vehicle owner or by the manner of programming by the vehicle manufacturer.

If the electric vehicle has a suitable input surface, the user of the vehicle can execute a large number of setting adjustments.

Thus for example, by means of a suitable input, the user can predetermine the periods of time, within which only discharging of the electrical energy storage device can take place at all, when connected to an electrical supply network.

As corresponding documentation of the charging and discharging operations shows, the user, even after several days, can still see when and what amounts of energy were fed into the electrical supply network.

In addition to the electrical energy storage device, for example a lithium battery or another storage technology, the vehicle according to the instant invention has a suitable power management system or control means 10 for controlling the charge condition of the electrical energy storage device 20 and for evaluation of the inputs of the user and also for documentation purposes.

In addition the vehicle can have a suitable data interface (in lieu or in addition to receiver/transmitter for wireless (cellular phone) control) so that the vehicle can send to or receive from a suitable interface of the electrical power supply utility, all data which are necessary for charging and also for discharging (feed into the network).

Such a data interface facilitates documentation of the respective discharging and charging conditions/times and billing thereof. In regard to billing, account is to be taken of the fact that current which is fed into the network at the midday peak can be reimbursed at a price higher than the price for night-time current which usually can be made available without any problem and at a lower price in relatively large amounts.

Discharging of the energy storage device with the feed of electrical energy into the power supply network, can also be used for possibly appropriately charging other vehicles with an electrical energy storage device, the charge condition of which has become too low, to such an extent that those vehicles can still continue to travel.

Therefore the invention also permits a plurality of vehicles to be electrically connected together, with their electrical energy storage devices.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the of the invention. Accordingly, the invention is not limited except as by the appended claims.

The invention claimed is:

1. A motor vehicle, comprising:
at least one electric motor;
an energy storage device for providing drive energy for the electric motor;
a plug connector connected to the energy storage device for connection to a current source; and
a control means for controlling flow of current between the current source and the energy storage device, wherein the control means permits a flow of current from the energy storage device to the current source, and the control means includes a device for detecting an amount of charge in the energy storage device and interrupts the flow of current from the energy storage device to the current source if a predeterminable threshold value of a remaining residual charge amount is reached, wherein the control means is programmable to allow discharge of the energy storage device by the flow of current from the energy storage device to the current source only during a predeterminable time period that is set by a user.

2. A motor vehicle as set forth in claim 1, further comprising a communication device for communication between the control means and an electrical supply network that includes the current source.

3. A motor vehicle as set forth in claim 1 wherein the control means includes a clock or is connected to a clock.

4. A motor vehicle as set forth in claim 1 wherein the control means can control charging of the energy storage device with controlled electrical energy if the energy storage device is connected to an electrical supply network that includes the current source.

5. A motor vehicle as set forth in claim 1, further comprising input means that are coupled to the control means and through which the user of the vehicle can set the period of time within which to at least partially implement the discharge of the storage device and feed energy into an electrical supply network that includes the current source.

6. A motor vehicle as set forth in claim 1, further comprising a power management program associated with the control means which, if the vehicle is connected to an electrical supply network that includes the current source, causes an automatic charging or discharging operation for the energy storage device.

7. A motor vehicle as set forth in claim 1 wherein the vehicle is fitted with a current meter/energy cell that measures electrical energy received in the energy storage device and energy fed into an electrical supply network that includes the current source.

8. A motor vehicle as set forth in claim 1, further comprising a vehicle is a recording unit provided in the vehicle that establishes when and what amount of electrical energy was charged into the energy storage device or fed into an electrical supply network that includes the current source.

9. A motor vehicle as set forth in claim 1, further comprising an electrical connection plug that can be connected to a corresponding connection plug of an electrical supply network that includes the current source, wherein the connection plug of the vehicle has a ground line, by which data of the vehicle can be exchanged via a data network of the electrical supply network and in addition further data can be fed in via the data network, including data about a condition of the electrical storage device of the vehicle.

10. A method of controlling flow of current between an energy storage device and an energy supply network, the method comprising:
obtaining user input that programs a discharge of the energy storage device by a flow of current from the energy storage device to the network only during predeterminable periods of time;
permitting flow of current from the network to the energy storage device in predeterminable first periods of time; and
permitting flow of current from the energy storage device to the network predeterminable second periods of time as programmed by the user input.

11. An electrical supply network, comprising:
a multiplicity of connections for motor vehicles, at least some of the motor vehicles including:
at least one electric motor;
an energy storage device to provide drive energy for the electric motor;
a plug connector coupled to the energy storage device and that can be coupled to one of the multiplicity of connections of the electrical supply network; and
a control unit to control flow of current between the electrical supply network and the energy storage device, wherein the control unit permits a flow of current from the energy storage device to the electrical supply network, and the control unit includes a device for detecting an amount of charge in the energy storage device and interrupts the flow of current from the energy storage device to the current source if a predeterminable threshold value of a remaining residual charge amount is reached, wherein the control unit is programmable to allow discharge of the energy storage device by the flow of current from the energy storage device to the electrical supply network only during a predeterminable time period that is set by a user.

12. The electrical supply network of claim 11 wherein if required, at least a partial discharge of a plurality of energy storage devices, coupled to the electrical supply network by way of respective multiplicity of connections, of vehicles is triggered based at least in part on energy needs of the electrical supply network.

13. A method of operating an electrical supply network to service motor vehicles including at least one electric motor, an energy storage device to provide drive energy for the electric motor a plug connector connected to the energy storage device for connection to the electrical supply network, and a control unit to permit and control flow of current between the electrical supply network and the energy storage device, the method comprising:

permitting flow of current from the electrical supply network to appropriate ones of the energy storage devices in predeterminable first periods of time and based at least in part on detected amounts of energy in each energy storage device;

permitting flow of current from appropriate ones of the energy storage device to the electrical supply network in predeterminable second periods of time and based at least in part on user input that programs discharge by the flow of current from the energy storage devices to the electrical supply network only during the second predeterminable periods of time; and if required, triggering at least partial discharge of a plurality of energy storage devices, connected to the electrical supply network, of vehicles based at least in part on energy needs of the electrical supply network.

14. The method of claim 13, further comprising interrupting the flow of current from appropriate ones of the energy storage devices to the electrical supply network if a predeterminable threshold value of a remaining residual charge amount in these energy storage devices is reached.

15. The method of claim 13, further comprising discharging energy from a first motor vehicle's first energy device coupled to the electrical supply network, and supplying the discharged energy to charge at least a second motor vehicle's second energy device.

* * * * *

UNITED STATES PATENT AND TRADEMARK OFFICE
CERTIFICATE OF CORRECTION

PATENT NO. : 7,042,176 B2  Page 1 of 1
APPLICATION NO. : 10/502492
DATED : May 9, 2006
INVENTOR(S) : Aloys Wobben It is certified that error appears in the above-identified patent and that said Letters Patent is hereby corrected as shown below:

<u>Column 8</u>
Line 4-5, "comprising a vehicle is a recording" should read as --comprising a recording--

Signed and Sealed this

Thirty-first Day of October, 2006

JON W. DUDAS
*Director of the United States Patent and Trademark Office*